Patented Aug. 31, 1937

2,091,799

UNITED STATES PATENT OFFICE 2,091,799

TITANIUM CONTAINING PRECIPITATES

Paul Weise, Leverkusen-I. G. Werk, Germany, assignor, by mesne assignments, to National Lead Company, New York, N. Y., a corporation of New Jersey No Drawing. Application January 27, 1934, Serial No. 708,702. In Germany February 23, 1933

17 Claims. (Cl. 134—58)

The present invention relates to titanium containing precipitates and to a process of preparing the same.

In accordance with the present invention titanium containing precipitates are prepared by precipitating titanium hydroxide from titanium salt solutions in the presence of finely dispersed salts of titanium which are difficultly soluble in dilute mineral acids. Such salts, which are difficultly soluble in mineral acids are, for example, titanium phosphates, titanium potassium sulfates, titanium potassium fluorides, titanium silicates and titanium zirconium compounds. These salts are prepared in the known manner, for instance, by double decomposition of a soluble titanium salt with a soluble other salt or acid yielding a titanium salt which is difficultly soluble in dilute acids (compare, for instance, Mellor, "A Comprehensive Treatise on Inorganic and Theoretical Chemistry", Vol. VII (1927) page 22, second paragraph, lines 11–13, page 95, lines 16–19, paragraph 3, lines 5–8). These salts are used in a dispersed state which is obtainable, for instance, by ionic reactions as by adding to a titanium salt solution a small amount of a solution of a soluble salt or the corresponding acid which forms a difficultly soluble salt with the titanium. The quantity of the added salt or acid must be so chosen that the precipitated difficultly soluble salt is still colloidally soluble in the excess of the titanium salt solution used. The precipitate obtained thereby is stirred until it is transformed into a sol of the difficultly soluble salt. When heating the sol obtained the difficultly soluble salt coagulates, whereby the degree of dispersion of the salt can be regulated in the known manner by the degree of temperature, the duration of the heating process and the concentration and acid content of the solution. Although, to some extent other known processes of preparing finely dispersed precipitates can be applied the best results are obtained from the use of a finely dispersed titanic salt precipitated from aqueous solution converted to a sol and coagulated to a fine dispersion. The finely dispersed salt is added to the titanium solution to be precipitated. It is evident that it is not necessary to coagulate the salt before adding it to the solution to be precipitated. The process can also be carried out by adding the sol to the solution to be precipitated and coagulating the difficultly soluble salt in the solution, for instance, by heating. It is not even necessary to prepare the sol outside the solution to be precipitated; the process can be effected by adding the soluble salt or acid, yielding with the titanium salt a difficultly soluble salt, to the titanium salt solution to be precipitated, stirring the precipitate obtained until it is converted into a sol and precipitating the difficultly soluble salt together with the titanium hydroxide. The precipitation of the titanium hydroxide from the titanium salt solution containing the finely dispersed difficultly soluble salt can be effected in the known manner by hydrolysis, for instance, by heating, by adding alkaline reacting compounds or also by diluting with water. The quantity of the added difficultly soluble titanium salt can be varied within wide limits; in general 2 to 6% are added calculated on the quantity of titanium dioxide to be precipitated.

The process is adaptable for the preparation of pure titanium pigments from titanium salt solutions as, for instance, sulfuric acid or hydrochloric acid solutions, and also for the preparation of composite titanium pigments, the precipitation being effected in the presence, for instance, of $BaSO_4$, $CaSO_4$, $SiO_2$ or other fillers. By the use of these finely dispersed difficultly soluble salts the precipitation of the titanium hydroxide is accelerated and the grain size becomes finer and more even than without the use of the finely dispersed salts.

A process is particularly important in which the precipitation of titanium hydroxide from titanium salt solutions takes place in the presence of a finely dispersed titanium phosphate. The products obtained thereby, containing intimately incorporated a small amount of titanium phosphate yield after calcination titanium pigments of great fineness possessing high coloring power and hiding power in which the titanium dioxide possesses a crystalline structure which is partly that of rutile and which do not give off phosphoric acid when treated with weakly acid solutions.

By calcining the products obtained in accordance with the process of the present invention pigments are obtained which display remarkably good pigment properties. Thus they possess a bright white color, high coloring and hiding power and excellent resistivity to weather.

The invention is further illustrated by the following examples without being restricted thereto:

*Example 1.*—80 ccs. of $H_3PO_4$ containing 220 grams of $P_2O_5$ per liter (or the equivalent quantity of a soluble phosphate) are added to 1 liter of a cold solution of titanium sulfate containing in 1 liter 100 grams of $TiO_2$, 50 grams of Fe in the form of $FeSO_4$ and 230 grams of $H_2SO_4$, while stirring. A voluminous precipitate separates which after stirring for about 20 hours completely disappears. Thus it becomes possible to obtain a solution which contains up to 40 grams of $P_2O_5$ in 1 liter. This solution is added to a titanium sulfate solution in such a quantity that the precipitate obtained after the hydrolysis has been effected contains 1% of $P_2O_5$. It is also possible to heat the sol of the titanium phosphate alone and to add this sol before or during the precipitation of the titanium hydroxide. The titanium phosphate can also be prepared in the solution which is to be hydrolized.

The precipitation of the titanium hydrate takes place according to known conditions. The precipitate is washed and calcined. A pigment of which 20-30% of the titanium dioxide content has the crystalline structure of rutile possessing high coloring power and a bright white color is thus obtained.

Example 2.—55 grams of $K_2SO_4$ are added in a concentrated solution to 1 liter of a titanium sulphate solution containing in 1 liter 120 grams of $TiO_2$, 40 grams of Fe in the form of $FeSO_4$ and 280 grams of $H_2SO_4$. A precipitate of potassium titanium sulfate is formed which after 12 hours' stirring completely disappears. The solution is then heated to boiling whereby first finely divided titanium potassium sulfate is precipitated which has a nucleating effect and whereupon all the titanium is precipitated in a finely divided form on further heating. It is possible to precipitate the finely dispersed titanium potassium sulfate alone and then add it to a titanium sulfate solution. The precipitate is washed and calcined. A pigment of high coloring power is thus obtained.

The expression "titanium salt solution" as used in this description is meant to include solutions in which substantially all the titanium present is in titanic condition, i. e. tetravalent titanium. It will be understood that in titanic salt solutions used for the precipitation of titanium hydroxide to be employed in the manufacture of titanium pigments there is usually present a small amount of reduced or trivalent titanium. The expressions "titanium salt solution" as used in this description and "titanic salt solution" as used in the claims appended hereto are meant to include such solutions which contain a relatively small amount of trivalent titanium.

I claim:—

1. The process of hydrolytically precipitating titanium hydroxide from a titanic salt solution, which comprises converting into a sol an inorganic titanic salt resulting from a reaction between a solution of a soluble inorganic titanium salt and a solution of a compound which with tetravalent titanium yields an inorganic titanic salt difficultly soluble in dilute mineral acids but colloidally soluble in excess of the said soluble inorganic titanic salt coagulating the said sol, adding the sol to the said titanic salt solution and heating the mixture.

2. The process of hydrolytically precipitating titanium hydroxide from a titanic salt solution, which comprises converting a titanium phosphate into a sol, coagulating the sol, adding the sol to the said titanic salt solution and heating the mixture.

3. In a process for hydrolytically precipitating titanium hydroxide from a titanic salt solution, the steps which consist in adding a sol of an inorganic titanic salt resulting from a reaction between a solution of a soluble inorganic titanium salt and a solution of a compound which with tetravalent titanium yields an inorganic titanic salt difficultly soluble in dilute mineral acids but colloidally soluble in excess of the said soluble inorganic titanic salt to a titanic salt solution and heating the mixture to produce coagulation of the said titanic salt in a finely dispersed condition within the said titanic salt solution.

4. The process for hydrolizing a titanic salt solution which comprises heating the said solution in the presence of a finely dispersed inorganic titanic salt resulting from a reaction between a solution of a soluble inorganic titanium salt and a solution of a compound which with tetravalent titanium yields an inorganic titanic salt difficultly soluble in dilute mineral acids but colloidally soluble in excess of the said soluble inorganic titanic salt and which is capable of accelerating the hydrolytic decomposition of the said titanic salt solution.

5. The process for hydrolizing a titanic salt solution which comprises heating the said solution in the presence of a finely dispersed titanium phosphate which is capable of accelerating the hydrolytic decomposition of the said titanic salt solution.

6. Process of preparing a precipitate containing titanium-oxygen compounds which comprises precipitating by thermal hydrolysis titanium hydroxide from a titanic salt solution in the presence of a small amount of a finely dispersed inorganic titanic salt coagulated from a sol of an inorganic titanic salt, said finely dispersed inorganic titanic salt resulting from a reaction between a solution of a soluble inorganic titanic salt and a solution of a compound which with tetravalent titanium yields an inorganic titanic salt difficultly soluble in mineral acids but colloidally soluble in an excess of the solution of said soluble inorganic titanic salt.

7. Process of preparing a precipitate containing titanium-oxygen compounds which comprises precipitating by thermal hydrolysis titanium hydroxide from a titanic salt solution in the presence of a small amount of a finely dispersed titanium phosphate coagulated from a sol of titanium phosphate said titanium phosphate resulting from a reaction between a solution of a soluble inorganic titanic salt and a solution containing phosphate ions.

8. Process of preparing a precipitate containing titanium-oxygen compounds which comprises precipitating by thermal hydrolysis titanium hydroxide from a titanic salt solution in the presence of a filler and a small amount of a finely dispersed inorganic titanic salt coagulated from a sol of an inorganic titanic salt, said finely dispersed salt resulting from a reaction between a solution of a soluble inorganic titanic salt and a solution of a compound which with tetravalent titanium yields an inorganic titanic salt difficultly soluble inorganic in mineral acids but colloidally soluble in an excess of the solution of said soluble titanic salt.

9. Process of preparing a precipitate containing titanium-oxygen compounds which comprises precipitating by thermal hydrolysis titanium hydroxide from a titanic salt solution in the presence of a small amount of a finely dispersed inorganic titanic salt coagulated from a sol of an inorganic titanic salt, said finely dispersed titanic salt resulting from a reaction between a solution of a soluble inorganic titanic salt and a solution of a compound which with tetravalent titanium yields an inorganic titanic salt difficultly soluble in mineral acids but colloidally soluble in an excess of the solution of said soluble inorganic titanic salt and which is capable of exerting a nucleating effect on the hydrolytic precipitation of said titanium hydroxide.

10. In the process of preparing a composition of matter comprising calcined titanium dioxide possessing a crystalline structure which is partly that of rutile and having intimately incorporated therewith a finely dispersed inorganic titanic salt, the step which consists in hydrolytically precipitating titanium hydroxide from a titanic salt solution in the presence of a small amount of a finely dispersed inorganic titanic salt, said finely dispersed inorganic titanic salt resulting from a reaction between a solution of a soluble inorganic titanic salt and a solution of a compound which with tetravalent titanium yields an inorganic titanic salt difficultly soluble in mineral acids but colloidally soluble in an excess of the solution of said soluble inorganic titanic salt.

11. In the process of preparing a composition of matter comprising calcined titanium dioxide possessing a crystalline structure which is partly that of rutile and having intimately incorporated therewith a finely dispersed inorganic titanic salt, the step which consists in hydrolytically precipitating titanium hydroxide from a titanic salt solution in the presence of a small amount of a finely dispersed titanium phosphate coagulated from a sol of titanium phosphate said titanium phosphate resulting from a reaction between a solution of a soluble inorganic titanic salt and a solution containing phosphate ions.

12. In the process of preparing a composition of matter comprising calcined titanium dioxide possessing a crystalline structure which is partly that of rutile and having intimately incorporated therewith a finely dispersed inorganic titanic salt, the step which consists in hydrolytically precipitating titanium hydroxide from a titanic salt solution in the presence of a filler and a small amount of a finely dispersed inorganic titanic salt coagulated from a sol of an inorganic titanic salt, said finely dispersed inorganic titanic salt resulting from a reaction between a solution of a soluble inorganic titanic salt and a solution of a compound which with tetravalent titanium yields an inorganic titanic salt difficultly soluble in mineral acids but colloidally soluble in an excess of the solution of said soluble inorganic titanic salt.

13. In the process of preparing a composition of matter comprising calcined titanium dioxide possessing a crystalline structure which is partly that of rutile and having intimately incorporated therewith a finely dispersed inorganic titanic salt, the step which consists in hydrolytically precipitating titanium hydroxide from a titanic salt solution in the presence of a small amount of a nucleating finely dispersed inorganic titanic salt, said salt resulting from a reaction between a solution of a soluble inorganic titanic salt and a solution of a compound which with tetravalent titanium yields an inorganic titanic salt difficultly soluble in mineral acids but colloidally soluble in an excess of the solution of said soluble inorganic titanic salt.

14. Process of preparing a precipitate containing titanium-oxygen compounds which comprises precipitating by thermal hydrolysis titanium hydroxide from a titanic salt solution in the presence of a small amount of a finely dispersed titanium-silicate coagulated from a sol of titanium silicate, said titanium silicate resulting from a reaction between a solution of a soluble inorganic titanic salt and a solution containing silicate ions.

15. Process of preparing a precipitate containing titanium-oxygen compounds which comprises precipitating by thermal hydrolysis titanium hydroxide from a titanic salt solution in the presence of a small amount of a finely dispersed titanium potassium sulfate coagulated from a sol of a titanium potassium sulfate resulting from a reaction between a solution of a soluble inorganic titanic salt and a solution containing potassium sulfate.

16. A pigment composition comprising a coprecipitated calcined mixture of titanium dioxide possessing a crystalline structure which is partly that of rutile and a small amount of intimately incorporated, finely dispersed, inorganic titanic salt resulting from the coagulation of a sol of the said inorganic titanic salt.

17. A pigment composition comprising a coprecipitated calcined mixture of titanium dioxide possessing a crystalline structure which is partly that of rutile and a small amount of intimately incorporated, finely dispersed, titanic phosphate resulting from the coagulation of a sol of titanic phosphate and which does not yield phosphoric acid when treated with weak acid solutions.

PAUL WEISE.